June 29, 1937.  H. LYON  2,085,264
MEASURING MECHANISM
Filed Dec. 15, 1933  3 Sheets-Sheet 3
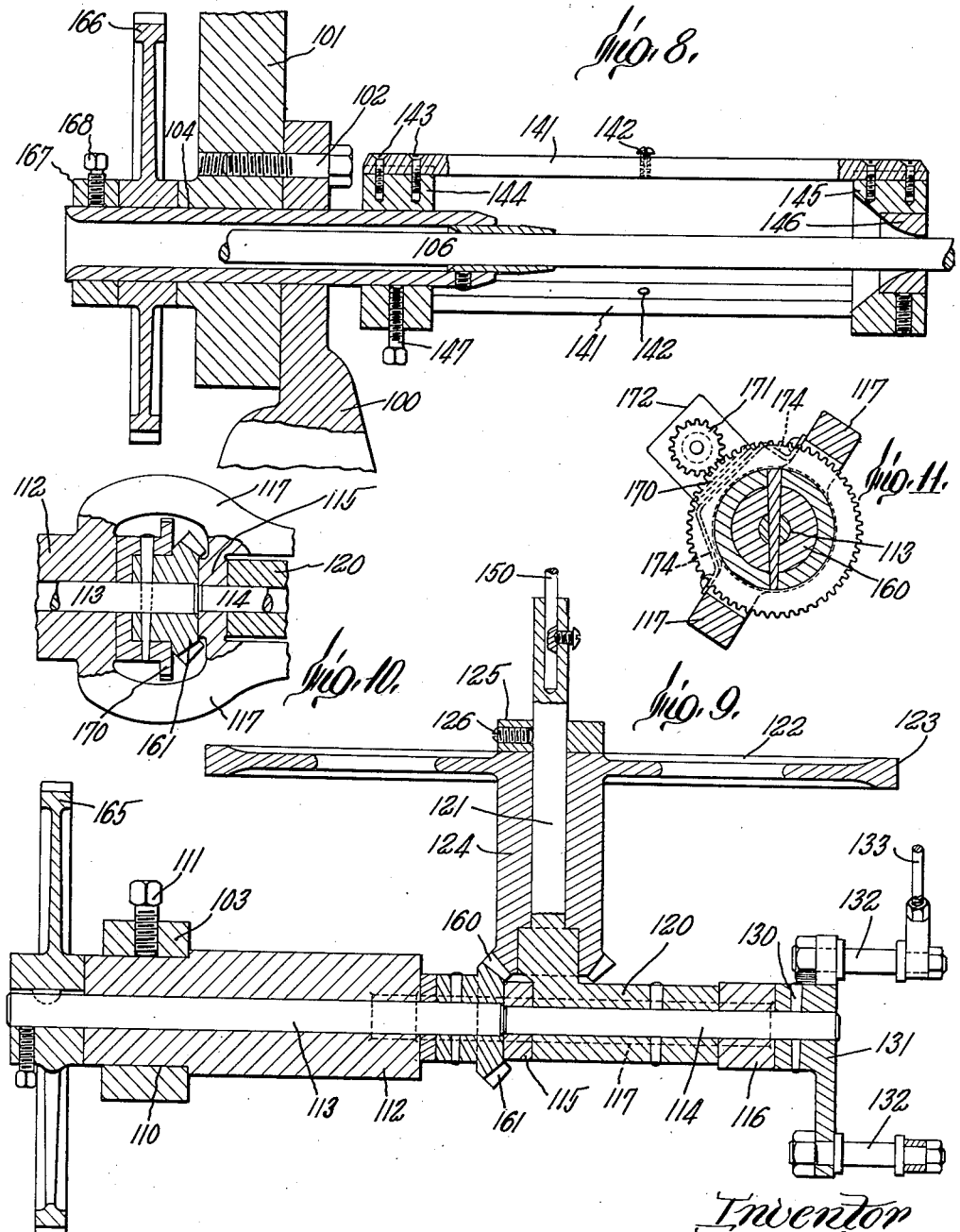
Inventor
Harry Lyon
by
Wright, Brown, Quinby & May
Attys Patented June 29, 1937

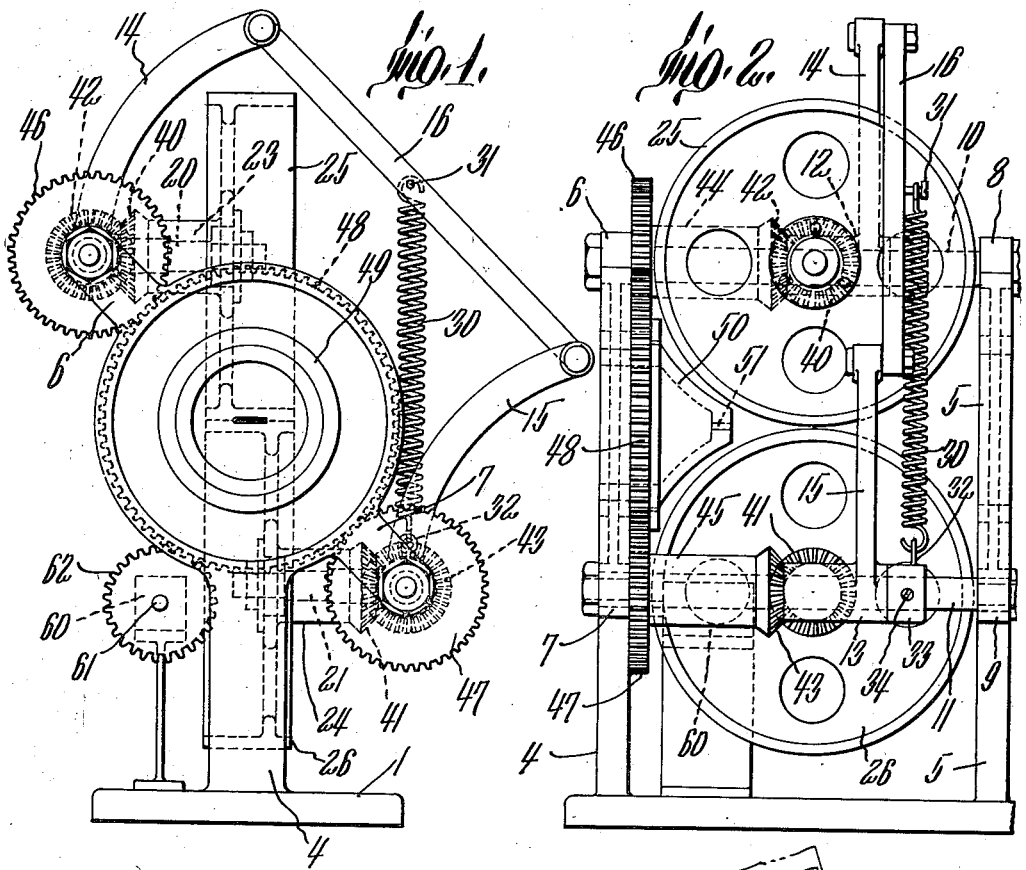
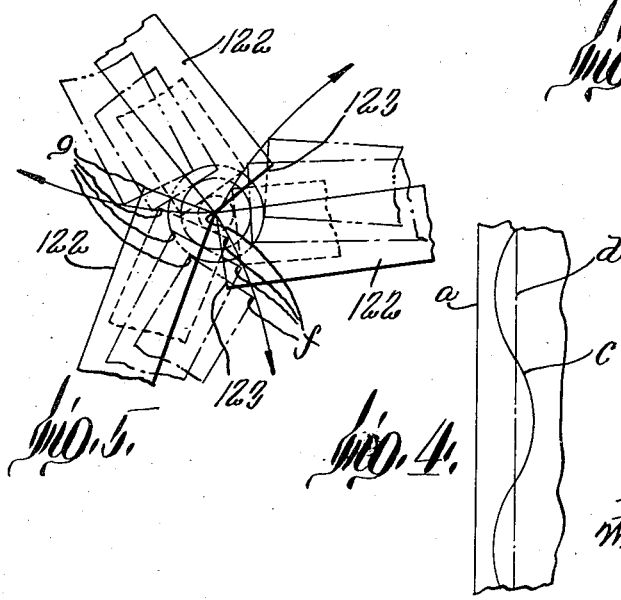

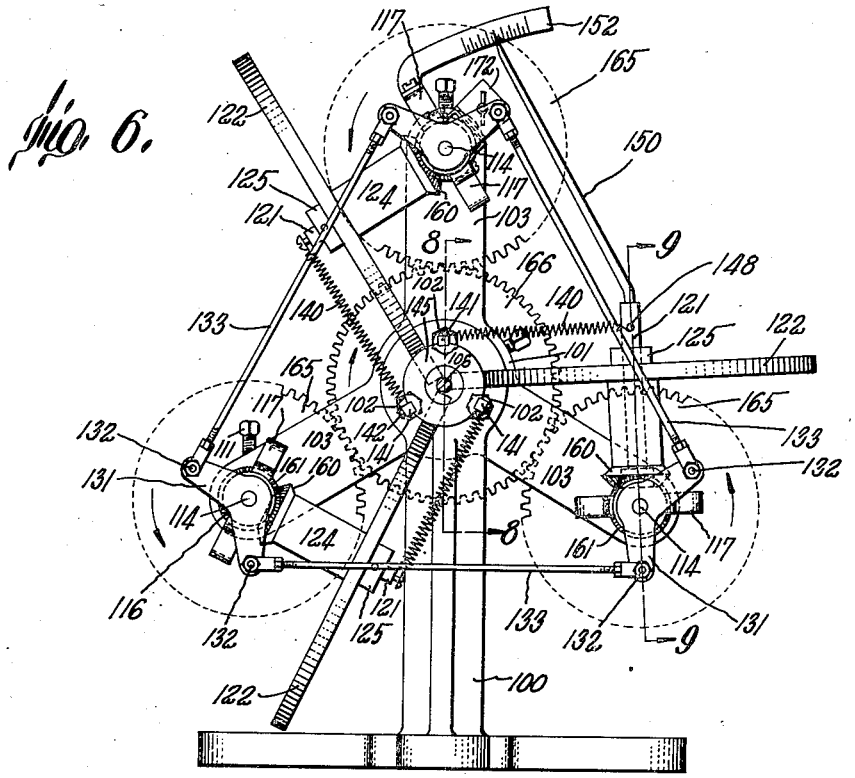
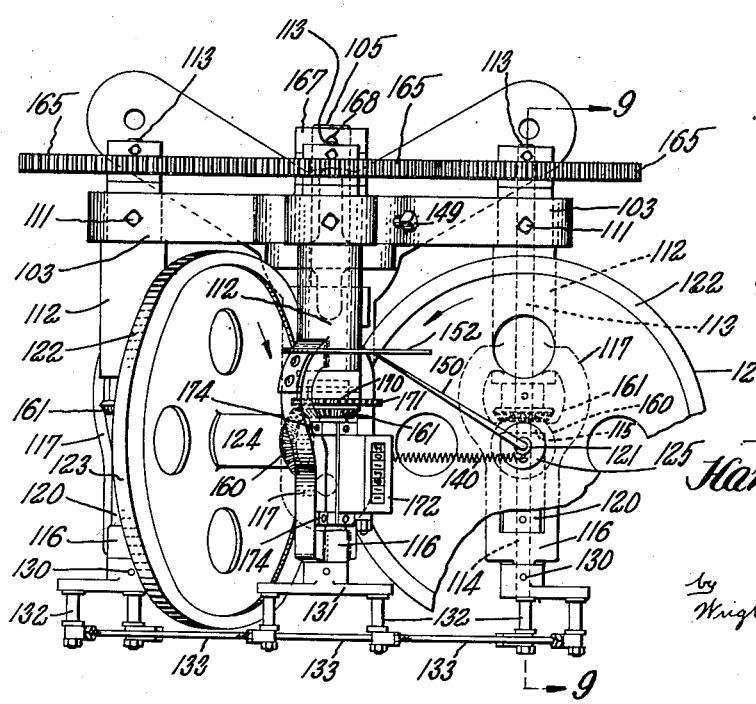

2,085,264

UNITED STATES PATENT OFFICE 2,085,264

MEASURING MECHANISM

Harry Lyon, Brockton, Mass., assignor to Lyon-Vail Machine Company, Inc., Brockton, Mass., a corporation of Massachusetts Application December 15, 1933, Serial No. 702,473

23 Claims. (Cl. 33—129)

This invention relates to measuring mechanism of that type in which sheet strip or strand material is drawn between endless surface members with successive portions of which the work successively contacts, the movement of these surface members with the passage of the material actuating an indicator.

One object of this invention is to increase the measuring accuracy of machines of this type. A further object is to prevent excessive and irregular wear of the measuring surface members. Both of the foregoing objects are obtained, in part at least, by so connecting the surface members that they are maintained against relative surface slippage, although being permitted to move from and toward each other to conform to inequalities of work thickness. Where the surface members are not held against slippage, slippage between the work and one or more of them is produced with a resultant departure from accuracy of measurement together with rubbing between the material and the members which results in flat spots and irregularities and further and permanent inaccuracy of measurement.

A further object is to maintain parallelism between the axis of the surface members, regardless of their spacing and this also is accomplished by the mounting and connections between the members.

A further object is to so construct a measuring machine of this type that the measurement may be a true lengthwise measurement of the material rather than of the surfaces against which the members bear, compensating automatically for varying thicknesses of the material.

A still further object is to provide a machine having the desired characteristics heretofore mentioned and applicable to the measuring of strand material such as wire or cord and which is applicable to measure spiral strand material such as loosely twisted double wire in a single covering.

This application is a continuation in part of my application for patent Serial No. 581,163 filed December 15, 1931, for Measuring mechanism.

For a more complete understanding of this invention, reference may be had to the accompanying drawings in which Figure 1 is a front elevation of one form of the machine.

Figure 2 is a side elevation thereof.

Figure 3 is a diagrammatic view showing the manner of contact of the roll surfaces on work of different thicknesses.

Figure 4 is a fragmentary development of the roll face illustrating the contact therewith of work of varying thickness.

Figure 5 is a view similar to Figure 3, but for a machine having three measuring rolls as shown in Figures 6 to 11, inclusive.

Figure 6 is a front elevation of the three-wheel machine.

Figure 7 is a top plan of the same.

Figure 8 is a detail section on line 8—8 of Figure 6.

Figure 9 is a detail section on line 9—9 of Figures 6 and 7.

Figures 10 and 11 are sectional details showing the driving connections to the indicator of the machine shown in Figures 6 and 7.

Referring to Figures 1 and 2, the machine comprises a base 1 having uprights 4 and 5 at opposite ends. These uprights are provided with oppositely disposed bearing lugs 6 and 7, 8 and 9, respectively, which are joined in pairs by the shafts 10 and 11 upon which are journaled the sleeves 12 and 13 which are provided with arms 14 and 15. These arms are joined together for simultaneous rocking movement of the sleeves 12 and 13, as by a link 16 pivoted at opposite ends to the extremities of the arms 14 and 15.

Each sleeve 12 and 13 is provided with a laterally extending shaft 20 and 21, respectively, on which is journaled a sleeve as 23 and 24, and to the inner ends of these sleeves are secured the measuring rolls 25 and 26. In the position shown in Figures 1 and 2 with no work to be measured in the machine, these rolls 25 and 26 have their peripheries in contact with each other and they are yieldingly held in such contact as by means of a spring 30, which is shown as hooked over the screw 31 carried by the link 16 and secured at the opposite end to an eye 32 carried by a collar 33 secured to the shaft 10 as by means of a set screw 34. The measuring wheels 25 and 26 present continuous peripheral surface portions for engagement with the work which is passed therebetween, as will be more fully explained, and as these wheels are rotated by the passage of the work therebetween, the sleeves 23 and 24 are correspondingly rotated. Each of these sleeves 23 and 24 is shown as provided at its outer end with a bevel gear such as 40 and 41, which gears mesh with similar gears 42 and 43 on sleeves 44 and 45 journaled on the shafts 10 and 11. These sleeves 44 and 45 have gears 46 and 47 thereon, both of which mesh with a ring gear 48 journaled on a hub 49 of the frame member 4. Thus the measuring wheels 25 and 26 are connected for simultaneous rotation so that they are moved at the same peripheral speed at all times, whereby the possibility of surface slippage between either roll and the work passed between them is minimized.

The hub 49 as shown is hollow and is so formed that it may receive interchangeably any of a series of work-presenting guide nozzle members 50, such nozzle members being preferably provided with throats 51 of suitable sizes and shapes to permit the passage of work to be measured, and to guide it between the faces of the measuring rolls.

It will be noted that the measuring rolls are so mounted that the spacing between them is adjustable to conform to the thickness of the material being measured, the rolls in separating rocking about the axes of the shafts 10 and 11, respectively, equally, the opposite portions of the peripheral faces of the rolls being maintained in parallel relation. This is shown in Figure 3 in which the rolls when in contact with each other are shown in full lines. Thus the space between the measuring rolls is maintained centered with relation to the work presenting nozzle members 50. If now work of the thickness shown by the dotted line circle $x$ be inserted therebetween, these rolls take the position shown in dotted lines, while if work such as shown in the dot and dash circle $y$ is inserted, the rolls take the relative positions as shown by dot and dash lines, while still larger work such as at $z$ causes the rolls to assume the position shown by outlines comprising two dots and a dash. While this form of the machine is more particularly intended for measuring flat work, nevertheless it is quite capable of being employed to measure round work, and round work has been shown in the diagram of Figure 3 in order to more clearly illustrate the action of the machine in automatically correcting for the excess surface length caused by thickness variations in the material being measured, whereby the machine is able to indicate the axial length of the material instead of the surface length with which the rolls engage. By reference to Figure 3, it will be noted that with increasing thicknesses of work between the rolls, the engagement between the rolls and the work, which, in the case of round work may be regarded as substantially a line contact, travels laterally across the face of each measuring roll toward the edges $a$ thereof, until with work of the size indicated by the circle $z$, the contact between the work and the rolls is at the extreme outer edge of the measuring surface of each. Thus, with work of varying thickness the line of contact between the work and the roll face may be as shown by the wavy line $c$ in Figure 4, which represents a development of a portion of the roll surface, the larger the work the more nearly this line of contact approaching the edge $a$, and the smaller the work the further inward from this edge this line of contact being positioned. Thus the total length of the wavy line $c$ represents the surface length of the material being measured, but the amount of actual rotation of the measuring wheels due to the passage of the work is represented by the straight line $d$ which represents the actual peripheral travel of the rolls. This peripheral travel only is taken cognizance of by the mechanism, the angular or lengthwise peripheral travel of the rolls being communicated to a suitable indicating instrument. As shown such an instrument may be located at 60, having an actuating shaft 61 to which is secured a gear 62 meshing with the gear 48. This indicator may be a revolution counter so calibrated as to read in the unit of length measurement desired.

By suitably proportioning the radius of the measuring wheel to the length of the lever arm formed by the shafts 20 and 21 from their centers of oscillation on the shafts 10 and 11, the amount of lateral travel of the contact between the measuring surfaces and the work in proportion to thickness variations of the work may be determined so that within the limits of facial contact between the measuring surfaces and the work, correction for thickness variations in the measurement indications may be made very accurate. Full correction may be closely approximated by making the distance from the center of oscillation of each measuring wheel shaft to the wheel plane in which the contact with the work lies for the major portion of the time it is being measured equal to the radius of the wheel. Slight variations from this may be required in particular cases in order to produce maximum accuracy. It should be recognized that the same correcting action takes place whether the work to be measured is of round cross section, flat, or of any other cross sectional shape, but for purpose of illustration it is more convenient to consider round work and assume a line contact between it and the measuring surfaces.

In Figures 6 to 11 is illustrated a measuring machine of this same general type, but particularly suitable for measuring strand material such as wire, rope or the like. Referring to these figures, at 100 is indicated a standard to the upper end of which is secured a frame 101 as by screws 102. This frame 101 has a plurality of radially extending arms 103, three of these arms being shown herein although more might be employed if desired. For measuring strand material, however, three or more are preferred in order to hold the strand between them. The fame 101 has a central opening 104 therethrough within which is secured as by a set screw 149 a guide tube 105 for the passage of the strand material such as 106, to be measured. At the outer end of each of the arms 103 there is an opening 110 within which is secured as by the set screw 111 a support 112. This support 112 forms a bearing for a pair of alined shaft sections 113, 114. The shaft section 114 is supported in spaced bearing portions 115 and 116 connected through integral arms 117 (see Figures 7 and 10) with the main portion of the support 112 in which the shaft 113 is journaled. On the shaft 114 between the bearings 115 and 116 is pinned a sleeve 120 which forms a support for a stub shaft 121 which extends therefrom at right angles to the shaft 114. On this stub shaft is journaled a measuring roll 122 having a narrow peripheral portion 123 and a hub portion 124 extending from one face thereof. A collar 125 secured as by means of a set screw 126 to the stub shaft 121 outwardly of the measuring roll 122 holds this measuring roll against axial movement away from the sleeve support 120.

Beyond the bearing 116 the shaft 114 has fixed thereto as by the pin 130 a bell crank lever 131. Each of these bell crank levers has posts 132 fixed to its arms and all the bell crank levers are connected together by means of the links 133 for simultaneous rocking movement. Rocking movement of the bell crank levers produce rocking movement of the shafts 114 to which they are secured and to the sleeve supports 120 which act to swing the measuring rolls 122 about the axes of the shafts 114 thus to bring peripheral portions thereof toward or from each other simultaneously. These measuring rolls thus present endless measuring surfaces arranged with adjacent portions defining between them a strand-receiving aperture, the size of which depends on the size of the strand being measured, the rolls radiating from this aperture at spacing angles depending on the number of rolls used. Preferably as shown these spacing angles will be less than 180° and preferably equal so that for a three-wheel machine each angle is 120°.

The measuring rolls are yieldingly urged toward each other to grip the strand material to be measured and this is accomplished, as shown, by coil springs 140 extending from the ends of the stub axles 121 to bars 141 which form parts of the cage member adjustable axially about the work-guiding tube 105, as shown best in Figure 8, and secured in adjusted position as by means of a set screw 147. Each of these bars 141 has suitable means such as a screw 142 to secure the inner end of one of the springs and each is secured as by screws 143 to a collar 144 angularly adjustable about the guide tube 105. The opposite ends of these bars 141 are shown as secured to a cylindrical block 145 having a strand guide 146 in a central opening therein. By rocking the cage comprising the bars 141 about the work axis, the tension on all the springs 140 is thus simultaneously adjusted.

Indication of the diameter of the work being measured may be produced as by a pointer 150 secured in the end of one of the stub shafts 121 and moving along a graduated dial 152 secured to the portion 117 of one of the supports 112 which carries one or the other measuring roll mountings, as the spacing between the measuring rolls changes.

The measuring rolls are connected together for simultaneous rotation and for actuating a length indicator. For this purpose each of the measuring roll hubs 124 is shown as provided at its inner end with an integral bevel gear portion 160 which meshes with a bevel gear 161 pinned to the adjacent shaft 113, this gear 161 being positioned between the bearing 115 and the main portion of the support 112. The other end of each shaft 113 has fixed thereto a large gear 165 and each of these gears 165 meshes with a gear 166 journaled on the work tube 105 and held in position thereon as by the collar 167 secured by the set screw 168. By the intermeshing of these gears all the measuring rolls are rotatable in unison so as to prevent relative slippage between their adjacent peripheral portions which are in engagement with the work and this rotary engagement in no way interferes with the movements of the measuring rolls toward and from each other to accommodate themselves to varying work diameters. These measuring rolls may be connected to an indicator in any suitable manner, but as shown in Figures 11 and 12 this is accomplished by providing on one of the shafts 113 between the bearing 115 and the main portion of the member 112, a gear 170 which meshes with a pinion 171 of the counter or indicator 172 which is secured as by a bracket 174 (see Figure 11) to the arms 117 of the support 112.

With this three-wheel arrangement as shown in Figures 6 and 7, there is a similar correction for measurement due to size variations in the work, as illustrated in Figure 5. Referring to this figure, it will be noted that when no work is positioned between the measuring rolls, these rolls make contact with each other at the edges f and if work of relatively small diameter, as shown by the inner dash line circle be interposed between these measuring rolls, the engagements of these rolls thereon are quite near to the edges f, the positions of the rolls being shown in dash lines. If now, work of a larger diameter is positioned between the measuring rolls, the contacts therewith of the measuring rolls are further removed from the edges f, as shown being substantially half way between the edges f and g, while with still larger diameter work, as shown by the circle of two dots and a dash, the contacts of the work with the roller faces are at the edges g. Thus, should the work being measured vary in diameter from point to point lengthwise, such variation will be indicated by a corresponding lateral travel across the endless faces of the measuring rolls of its contact therewith. The size variations in work being measured will thus result in contact with each measuring roll moving laterally of its face, tracing a path thereon other than a straight line, departures from straight line contact corresponding to size variations in the material being passed through the machine, in the same manner as with the two-wheel machine. Thus the wavy line c in Figure 4 also may represent the contact line between the work and measuring surface in the three roll machines where material being measured varies in diameter, whereas the actual length registered on the machine is not the length of this wavy line but that of the straight line length represented by the line d.

By properly proportioning the distances from the central plane of a measuring roll to its pivotal axis 114 relative to the distance of this pivot 114 from the axis of the work, the extent of lateral motion across the measuring roll face relative to the diameter variation in the work may be so determined that size variation of the work may be automatically corrected for in the instrument reading to any desired extent, and for any reasonable size variation this correction may be made so extremely accurate that the instrument will give an accurate reading of the axial length of the work passed therethrough instead of the length of the surface over which the rolls travel, which when the work varies in diameter is greater than the axial length. Such excess length is then equal to the excess length of actual contact path on each roll face to the straight line distance along the perimeter of the roll through which said contact has occurred.

Thus work of irregular diameter such as a strand comprising a pair of wires twisted together may be run through the machine and the axial length of the strand rather than the surface length with which the rolls contact is measured.

So far as I am aware automatic correction for size variation effecting a subtraction of the excess of surface length over axial length in the register reading is accomplished in no other measuring machine ever devised.

Of course, material larger in diameter than that of the largest circle shown in Figure 5 may be passed through the machine and be measured, but the measurement of this larger diameter work will be that of its surface length, there being then no correction for size variations since there is no lateral travel of the work with relation to the roll surface. A similar situation applies also to the two roll machine.

From the foregoing description it will also be evident that many other changes or modifications might be made without departing from the spirit or scope of this invention as defined by the appended claims.

I claim:

1. A machine of the class described, comprising a member presenting an endless surface with successive portions of which material to be measured may contact, said member being mounted so that said endless surface may move with said material lengthwise of said material, means controlled by thickness irregularities of said material to move said member laterally of its lengthwise motion relative to such material to vary the contact between said material and surface laterally of said surface in accordance with such irregularities, and means for indicating the lengthwise travel only of said surface.

2. A machine of the class described comprising a member presenting an endless surface with successive portions of which material to be measured may contact, said member being mounted so that said endless surface may move with said material lengthwise of said material, means for indicating the lengthwise travel of said surface, and means controlled by thickness variation in said material to move said member laterally of its lengthwise motion relative to such material to vary the contact between said material and surface laterally of said surface in accordance with such variations to an extent to cause the indicated longitudinal component of such contact to be equal to the axial instead of to the surface length of the material measured.

3. A machine of the class described, comprising a plurality of members each presenting an endless surface between which surfaces material to be measured may be passed, said members being mounted so that said surfaces and material move together, means for supporting said members for movement from and toward each other in accordance with variations in transverse dimensions of said material and to vary the contact of said material laterally of said surfaces in accordance with such variation, and means for indicating the lengthwise travel only of said surfaces.

4. A machine of the class described comprising a plurality of members each presenting an endless surface with successive portions of which material may contact, said members being mounted so that said endless surfaces may move with said material lengthwise of said material as said material passes between said surfaces, means for indicating the lengthwise travels of said surfaces, and means controlled by thickness variations in said material to move said members laterally of their lengthwise motions relative to such material to vary the contact between said material and each surface laterally of such surface in accordance with such variations to an extent to cause the indicated longitudinal component of said contact to be equal to the axial instead of to the surface length of the material measured.

5. A machine of the class described, comprising a pair of endless surface members between which material to be measured may be passed, means supporting said members for movement from and toward each other and with a component laterally of the direction of passage of the material therebetween in accordance with the thickness of such material and so that said surfaces and material move together, and an indicator responsive to the extent of longitudinal motion only of the surfaces of said members.

6. A machine of the class described, comprising a pair of endless surface members between which material to be measured may be passed, means supporting said members for movement from and toward each other and with a component laterally of the direction of passage of the material therebetween in accordance with the thickness of such material while maintaining said surfaces in parallel relation laterally of said passage direction and so that said surfaces and material move together, and an indicator responsive to the extent of longitudinal motion only of the surfaces of said members.

7. A machine of the class described, comprising a pair of endless surface members between which material to be measured may be passed, means supporting said members for movement from and toward each other and with a component laterally of the direction of passage of the material therebetween in accordance with the thickness of such material and so that said surfaces and material move together, means connecting said members for simultaneous and equal surface velocities, and an indicator responsive to the extent of longitudinal motion only of the surfaces of said members.

8. A machine of the class described, comprising a pair of endless surface members between which material to be measured may be passed, means supporting said members for movement from and toward each other and with a component laterally of the direction of passage of the material therebetween in accordance with the thickness of such material while maintaining said surfaces in parallel relation laterally of said passage direction and so that said surfaces and material move together, means connecting said members for simultaneous and equal surface velocities, and an indicator responsive to the extent of longitudinal motion only of the surfaces of said members.

9. A machine of the class described, comprising a plurality of endless surface members between which material to be measured may be passed to be moved by contact therewith, means supporting said members for relative movement from and toward each other to conform to the thickness of the work being measured and so that said surfaces and material move together and for causing relative motion of said members laterally of the direction of travel of the material as they move relatively from and toward each other thereby to cause lateral motion of the contact of said work on said surfaces as said work varies in thickness, and means responsive only to the motion of said surface members lengthwise of said material for indicating the length of material passed therebetween.

10. A machine of the class described, comprising a plurality of endless surface members between which material to be measured may be passed to be moved by contact therewith, means supporting said members for relative movement from and toward each other to conform to the thickness of the work being measured and so that said surfaces and material move together and for causing relative motion of said members laterally of the direction of travel of the material as they move relatively from and toward each other thereby to cause lateral motion of the contact of said work on said surfaces as said work varies in thickness, means connecting said members for simultaneous and equal motion of their work-engaging surfaces, and means responsive only to the motion of said surface members lengthwise of said material for indicating the length of material passed therebetween.

11. A machine of the class described, comprising a frame, a pair of spaced parallel supporting shafts carried by said frame, a rotary element extending transversely of each supporting shaft, a measuring roll carried by each rotary element eccentric to its supporting shaft, said rolls presenting confronting faces between which work to be measured may be passed, gearing connecting said rotary elements for equal and simultaneous rotation with equal peripheral velocities of said rolls, yielding means forcing said rolls toward each other about the axes of said supporting shafts to grip the work, and an indicator for indicating the extent of peripheral motion of said rolls.

12. A machine of the class described, comprising a frame, a pair of spaced parallel supporting shafts carried by said frame, a rotary element extending transversely of each supporting shaft, a measuring roll carried by each rotary element eccentric to its supporting shaft, said rolls presenting confronting faces between which work to be measured may be passed, gearing connecting said rotary elements for equal and simultaneous rotation with equal peripheral velocities of said rolls, connections between said rotary elements insuring equal and opposite motions of said rolls from and toward each other, yielding means forcing said rolls toward each other about the axes of said supporting shafts to grip the work, and an indicator for indicating the extent of peripheral motion of said rolls.

13. A machine of the class described, comprising a frame, a pair of supporting elements carried in said frame in spaced parallel relation, a rock member journaled on each supporting shaft, a rotary element carried by each rock member and extending with its axis transverse to its supporting shaft, a measuring roll carried by each rotary shaft, said rolls presenting confronting peripheral faces between which work to be measured may be passed, connections between said rock members insuring equal and opposite motions thereof in approach and separation of said faces, yielding means for pressing said rolls toward each other, rotary sleeves journaled on said supporting shafts, gearing between said rotary sleeves and rotary elements, a ring gear journaled on said frame, a gear on each rotary sleeve meshing with said ring gear, a work support arranged axially of said ring gear for guiding work through said ring gear and between said rolls, and an indicator responsive to the rotation of said rolls.

14. A machine of the class described, comprising a plurality of measuring rolls between which the material to be measured may be drawn, means for presenting the material to said rolls, means for supporting and connecting said rolls for simultaneous movement from and toward each other and relative to said presenting means to allow for different sizes of work and to maintain the space therebetween centered with respect to said presenting means, means for individually pressing said rolls toward each other, driving connections between said rolls, and an indicator responsive to the rotation of said rolls.

15. A machine of the class described, comprising a plurality of rolls arranged with a plane of rotation intersecting material to be measured which may be drawn therebetween with said rolls bearing thereon, means for presenting the material to said rolls, means for supporting and connecting said rolls for rotation and movable to bring their adjacent peripheral portions simultaneously toward and from each other to maintain the space therebetween centered with relation to said presenting means, operative rotary connections between said rolls insuring against relative slippage between said portions during movement thereof from and toward each other, yielding means for pressing said rolls against work therebetween, and an indicator operatively related to said rolls to be driven by rotation thereof.

16. A machine of the class described, comprising more than two endless measuring surface members arranged with adjacent portions defining between them an aperture to receive strand material and radiating from said aperture, means carrying said members for movement of their measuring surface portions with strand material passing therebetween, and an indicator responsive to measuring movement of at least one of said surface members.

17. A machine of the class described, comprising more than two endless measuring surface members arranged with adjacent portions defining between them an aperture to receive strand material and radiating from said aperture at angles of less than 180° between adjacent members, means carrying said members for movement of their measuring surface portions with strand material passing therebetween, and an indicator responsive to measuring movement of at least one of said surface members.

18. A machine of the class described, comprising more than two endless measuring surface members arranged with adjacent portions defining between them an aperture to receive strand material and radiating from said aperture with substantially equal angles between adjacent members, means carrying said members for movement of their measuring surface portions with strand material passing therebetween, and an indicator responsive to measuring movement of at least one of said surface members.

19. A machine of the class described, comprising more than two rolls arranged on relatively inclined rotational axes with a plane of rotation intersecting material to be measured which may be drawn therebetween with said rolls bearing thereon, means for supporting said rolls for rotation and movable to bring their adjacent peripheral portions simultaneously toward and from each other, operative rotary connections between said rolls insuring against relative slippage between said portions during movement thereof from and toward each other, yielding means for pressing said rolls against work therebetween, and an indicator operatively related to said rolls to be driven by rotation thereof.

20. A machine of the class described, comprising more than two relatively narrow rolls, a support for rotatably carrying each roll, a frame having radially extending arms on each of which one of said supports is rockably mounted at one side of its roll, the rocking axes of said supports being substantially parallel, connections between said supports insuring simultaneous rocking movements thereof to bring peripheral portions of said rolls simultaneously from or toward each other to accommodate themselves to the size of strand material to be measured passed therebetween, yielding means for closing said rolls on said material, rotary means connecting said rolls insuring simultaneous and equal peripheral movements thereof, and an indicator driven by said rotary means.

21. A machine of the class described, comprising more than two relatively narrow rolls, a support for rotatably carrying each roll, a frame having radially extending arms on each of which one of said supports is rockably mounted at one side of its roll, the rocking axes of said supports being substantially parallel, connections between said supports insuring simultaneous rocking movements thereof to bring peripheral roll portions simultaneously from or toward each other to accommodate themselves to the size of strand material to be measured passed therebetween, yielding means for closing said rolls on said material, and an indicator responsive to the angular positions of said supports.

22. A machine of the class described, comprising more than two relatively narrow rolls, a support for rotatably carrying each roll, a frame having radially extending arms on each of which one of said supports is rockably mounted at one side of its roll, the rocking axes of said supports being substantially parallel, connections between said supports insuring simultaneous rocking movements thereof to bring peripheral portions of said rolls simultaneously from or toward each other to accommodate themselves to the size of strand material to be measured passed therebetween, yielding means for closing said rolls on said material, rotary means connecting said rolls insuring simultaneous and equal peripheral movements thereof, an indicator driven by said rotary means, and an indicator responsive to the angular positions of said supports.

23. A machine of the class described, comprising three relatively narrow rolls each having a hub portion extending from one face, a support for each roll having a stub shaft on which said roll is journaled, a frame having three radially extending arms on each of which one of said supports is rockably mounted at right angles to its stub shaft, the rocking axis of said supports being parallel, links connecting said supports for insuring simultaneous and equal rocking of said supports to move peripheral portions of said rolls simultaneously from or toward each other to conform to the size of the strand material passed therebetween, a member angularly adjustable on said frame about the axis of said material, a spring extending from said member to each of said stub axles to cause said rolls to be pressed toward each other and against the work, angular adjustment of said member acting to simultaneously and similarly adjust the tensions of all of said springs, a rotary shaft carried by each arm in the axis of rotation of its support, rotary connections between each rotary shaft and the hub of its adjacent roll, a gear on the outer end of each rotary shaft, a central gear meshing with each of said shaft gears insuring simultaneous rotation of said rolls, and an indicator operatively connected to one of said rotary shafts.

HARRY LYON.